United States Patent Office 3,226,385
Patented Dec. 28, 1965

3,226,385
SUBSTITUTED 3-(α-ACYLOXY-LOWER ALKYL)-4,7-INDOLOQUINONES
George Rodger Allen, Jr., Old Tappan, N.J., and John Frank Poletto, Nanuet, N.Y., assignors to American Cyanamid Company, Stamford, Conn., a corporation of Maine
No Drawing. Filed Oct. 11, 1963, Ser. No. 315,695
8 Claims. (Cl. 260—240)

This invention relates to new organic compounds and, more particularly, is concerned with novel substituted 3-(α-acyloxy-lower alkyl)-4,7-indoloquinones and with novel methods of preparing these compounds. The novel substituted 3-(α-acyloxy-lower alkyl)-4,7-indoloquinones of the present invention may be represented by the following general formula:

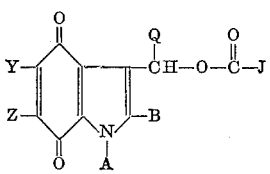

wherein A is lower alkyl, B is hydrogen or lower alkyl, Q is hydrogen or lower alkyl, Y is hydrogen, halogen or lower alkoxy, Z is hydrogen or lower alkyl and J is lower alkyl, lower cycloalkyl, phenyl, phenyl lower alkyl, α-lower acyloxy phenyl lower alkyl, phenoxymethyl, 2-furyl, lower alkenyl and phenyl lower alkenyl. Suitable lower alkyl and lower alkoxy groups contemplated by the present invention are those having up to about 6 carbon atoms. Suitable lower cycloalkyl groups contemplated by the present invention are, for example, cyclopentyl and cyclohexyl. Suitable phenyl lower alkyl substituents are, for example, benzyl and phenethyl. Halogen is exemplified by chlorine and bromine. Suitable lower alkenyl and phenyl lower alkenyl substituents are, for example, allyl, crotonyl and cinnamyl. α-lower acyloxy phenyl lower alkyl is exemplified by α-acetoxybenzyl.

The novel compounds of the present invention are obtainable as crystalline materials having characteristic melting points and absorption spectra. They are appreciably soluble in many organic solvents such as lower alkanols, acetone, ethyl acetate, and the like. They are, however, generally insoluble in water. The novel compounds of the present invention are useful as antibacterial agents. These compounds have been found to possess broad spectrum antibacterial activity in vitro. The minimal inhibitory concentrations, expressed in gammas per milliliter, of some typical compounds of the present invention against *Staphylococcus aureus* when measured by a standard turbidimetric procedure are set forth in the following table:

Table I

| Compound: | Minimal inhibitory conc. in γ/ml. |
|---|---|
| 1-ethyl-3-hydroxymethyl-5-methoxy-2,6-dimethyl-4,7-dioxoindole acetate | 6 |
| 1-ethyl-3-hydroxymethyl-5-methoxy-2,6-dimethyl-4,7-dioxoindole propionate | 12 |
| 1-ethyl-3-hydroxymethyl-5-methoxy-2,6-dimethyl-4,7-dioxoindole isobutyrate | 12 |
| 1-ethyl-3-hydroxymethyl-5-methoxy-2,6-dimethyl-4,7-dioxoindole O-acetylmandelate | 25 |
| 1-ethyl-3-hydroxymethyl-5-methoxy-2,6-dimethyl-4,7-dioxoindole crotonate | 12 |

In addition, certain of the novel compounds of the present invention possess activity both orally and parenterally against *Staphylococcus aureus*, strain Smith, infections in mice. In particular, 1-ethyl-3-hydroxymethyl-5-methoxy-2,6-dimethyl-4,7-dioxoindole acetate has shown extraordinary antibacterial activity, when tested by the subcutaneous route, against *Staphylococcus aureus*, strain Smith, infections in mice. *Staphylococcus aureus*, strain Smith, has been studied and described by J. M. Smith and R. J. Dubos in Journ. Expt. Med. 103, 87 (1956), at the Rockefeller Institute. *Staphylococcus aureus*, strain Smith, is coagulase positive, tellurite negative and is sensitive to tetracycline, penicillin, streptomycin, erythromycin, carbomycin, neomycin, chloramphenicol and novobiocin in vitro. Attempts have been made for phage typing of this strain, but it has been determined that it is non-typable.

The novel compounds of the present invention may be prepared as set forth in the following reaction scheme:

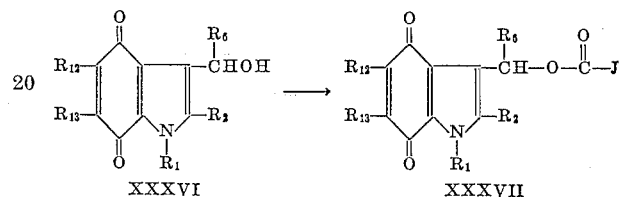

wherein $R_1$ is lower alkyl; $R_2$, $R_6$ and $R_{13}$ are each hydrogen or lower alkyl; $R_{12}$ is hydrogen, halogen or lower alkoxy; and J is as hereinabove defined. In accordance with this reaction scheme, treatment of a 3-(α-hydroxyalkyl)-4,7-indoloquinone (XXXVI) with an acylating agent furnishes the corresponding 3-(α-acyloxyalkyl) derivative (XXXVII).

The requisite 3-(α-hydroxyalkyl)-4,7-indoloquinones may be prepared in several ways, principally in accordance with the following reaction scheme:

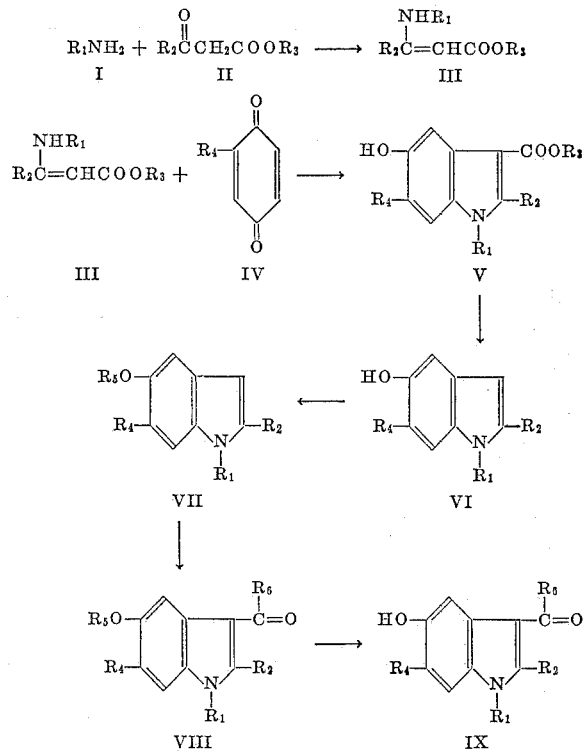

wherein $R_1$, $R_2$, $R_3$, $R_4$ and $R_5$ are lower alkyl and $R_6$ is hydrogen or lower alkyl. In accordance with this reaction scheme, the indole system (V) is developed by condensation of a substituted 1,4-benzoquinone (IV) with a substituted amino-crotonate ester (III). The latter reagent is prepared by the interaction of an appropriate amine (I) with a β-ketoester (II). The resulting 5-hydroxy-3-indolecarboxylic ester (V) may be converted into other useful 5-hydroxyindoles (IX). Thus, decarbalkoxylation of the 3-indolecarboxylic ester (V) gives the hydroxyindoles (VI); a particularly useful reagent for this transformation being hydrochloric acid. The resulting 5-hydroxyindole (VI) is then O-alkylated to furnish the 5-alkoxyindole (VII). Treatment of this product with phosphorus oxychloride and dimethylformamide or with an alkanoyl anhydride and alkali metal alkanoate affords the corresponding 3-carboxaldehyde or 3-acyl derivative (VIII). The ether function in this class of compounds is then cleaved to give the important 5-hydroxyindoles (IX); this cleavage may be effected with hydriodic acid or aluminum chloride in boiling xylene.

As set forth in the following reaction scheme:

O-alkylated to give the corresponding 5-alkoxy-para-quinones; of particular value for this conversion are the dialkyl sulfates and tetra-alkoxymethanes. The alkylation of a 5-hydroxy-para-quinone containing a 3-carboxy substituent produces the 3-carbalkoxy-5-alkoxy-para-quinone. The 5-hydroxy-para-quinones (XIII) are also useful intermediates for the preparation of 5-halo-para-quinones, a conversion described in greater detail below. Reduction of the 5-alkoxy-para-quinones (XIV), followed by oxidation of the hydroquinone thus formed, gives the important 3 - (α - hydroxyalkyl) - para - quinones (XV). When the 5-alkoxy-para-quinones (XIV) have a carbalkoxy substituent in the 3-position, lithium aluminum hydride is used for this reduction. For those 5-alkoxy-para-quinones (XIV) having a formyl or acyl substituent at the 3-position, sodium borohydride is particularly useful for this reduction.

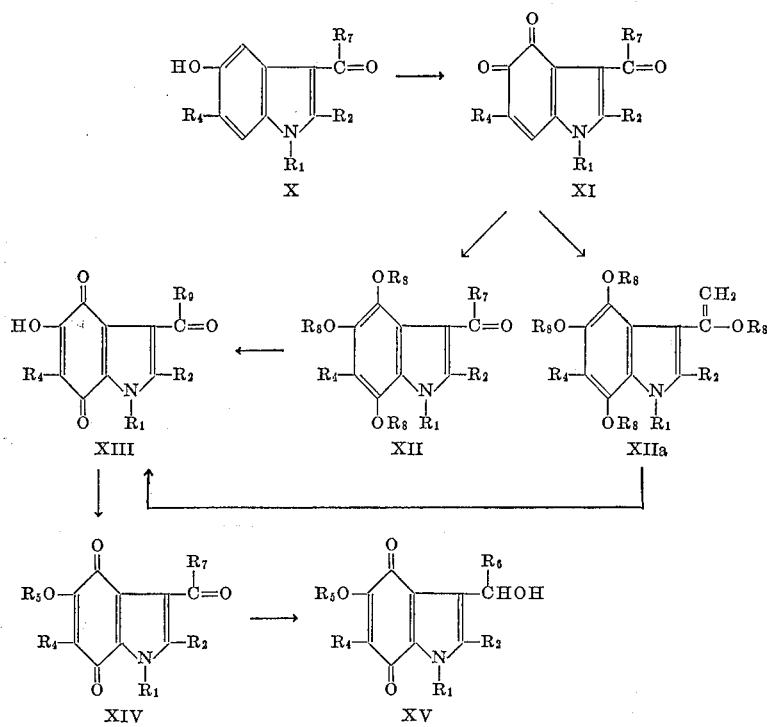

wherein $R_1$, $R_2$, $R_4$ and $R_5$ are lower alkyl; $R_7$ is hydrogen, lower alkyl or lower alkoxy; $R_8$ is lower alkanoyl and $R_9$ is hydrogen, hydroxy or lower alkyl; the previously described 5-hydroxyindoles (X) may be converted into 4,5-ortho-quinones (XI) by any of several methods well known to the art for the conversion of a phenol into an ortho-quinone. Particularly useful for this transformation is potassium nitrosodisulfonate (Fremy's Salt) which accomplishes this conversion in one step. Conversion of an ortho-quinone (XI) into the para-quinone (XIII) is achieved via an intermediate 4,5,7-loweralkanoyloxyindole (XII), prepared by treating the ortho-quinone with a loweralkanoyl anhydride and a strong acid such as boron trifluoride. When the ortho-quinone (XI) contains a 3-acyl substituent, concomitant enol acylation of the carbonyl group occurs to give (XIIa). The triacyloxyindoles (XII and XIIa) then may be hydrolyzed to the corresponding trihydricphenols, which on oxidation with air or other oxidizing agents, furnish the corresponding 5-hydroxy-para-quinone (XIII). During the hydrolysis step, a 3-carbalkoxy group is hydrolyzed to the corresponding acid, and the enol acylate (XIIa) formed in the acylation of an ortho-quinone containing a 3-acyl substituent is hydrolyzed to regenerate the 3-acyl substituent. The 5-hydroxy-para-quinones (XIII) may be The important 3-(α-hydroxyalkyl)-4,7-indoloquinones may also be prepared as set forth in the following reaction scheme:

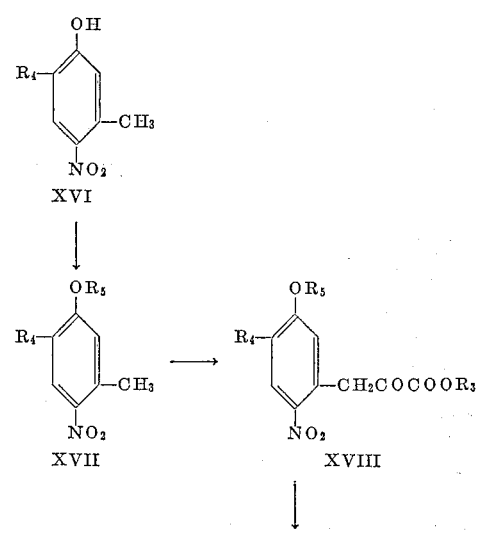

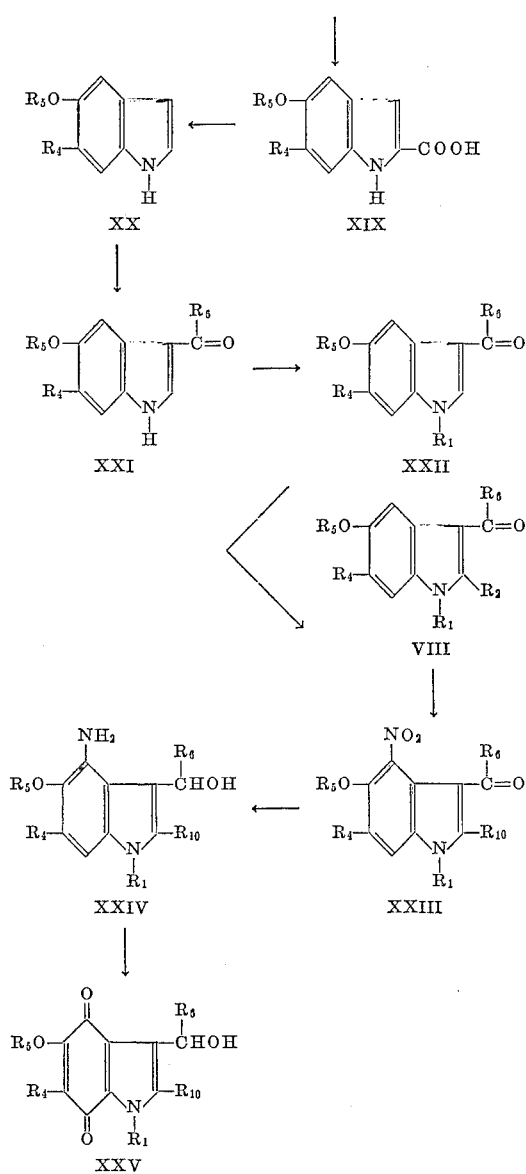

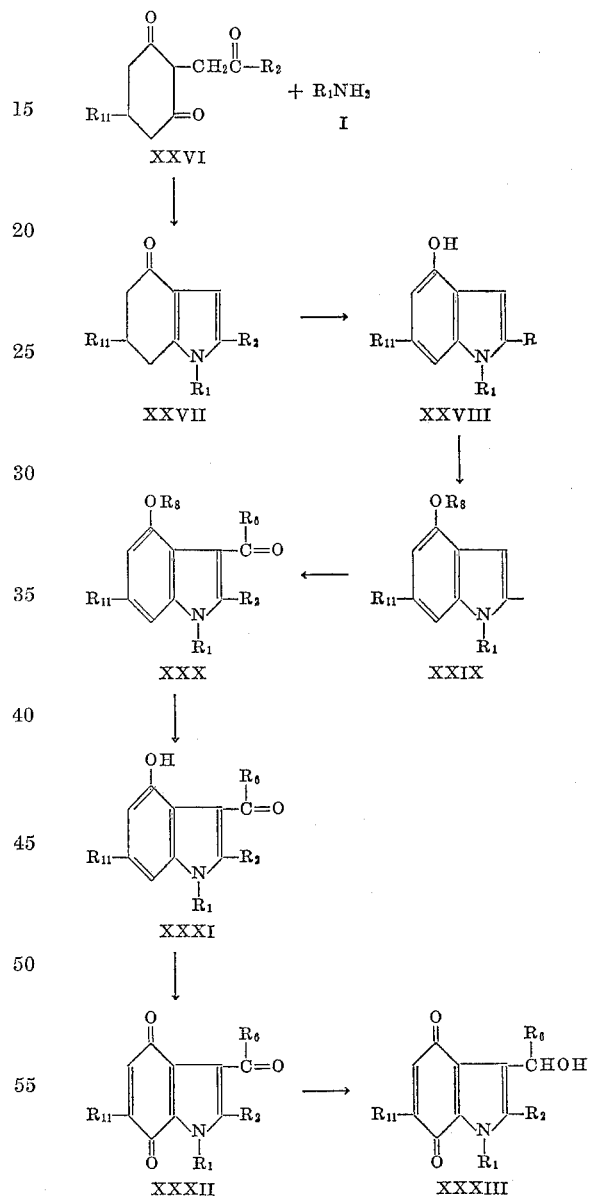

nitrate in sulfuric acid or fuming nitric acid in acetic acid. On hydrogenation in the presence of a noble metal catalyst the 4-nitroindoles (XXIII) are transformed into the 4-amino-3-(α-hydroxyalkyl)indoles (XXIV), which on treatment with an oxidizing agent such as Fremy's Salt give the requisite 3-(α-hydroxyalkyl)-4,7-indoloquinones (XXV).

Certain of the requisite 3-(α-hydroxyalkyl)-4,7-indoloquinones may also be obtained in accordance with the following reaction scheme:

wherein $R_1$, $R_2$, $R_3$, $R_4$ and $R_5$ are lower alkyl; and $R_6$ and $R_{10}$ are hydrogen or lower alkyl. This sequence is of particular value for the preparation of those 3-(α-hydroxyalkyl)4,7-indoloquinones bearing hydrogen at the 2-position, i.e., compounds such as (XXV) wherein $R_{10}$ is hydrogen. In accordance with this reaction scheme an ortho-alkyl-para-nitro-meta-cresol (XVI) is treated with an alkylating agent such as an alkyl halide or dialkyl sulfate in the presence of base to give the alkyl aryl ether (XVII). Base-catalyzed acylation of (XVII) with a dialkyl oxalate affords the glyoxylic ester (XVIII). Reductive cyclization of this ester furnishes a 6-alkyl-5-alkoxy-2-indolecarboxylic acid (XIX); this reductive cyclization may be achieved with zinc dust in acetic acid, ferrous ammonium sulfate, sodium hydrosulfite or the like. Decarboxylation of the acid (XIX) then gives the indole (XX) which on treatment with phosphorus oxychloride and dimethylformamide or a dimethylalkanoylamide furnishes the 3-formyl- or 3-acylindole (XXI). On treatment with a strong base such as potassium hydroxide or sodium hydride and an alkylating agent such as an alkyl halide or a dialkyl sulfate, the 3-formyl and 3-acylindoles (XXI) afford the corresopnding 1-alkyl derivatives (XXII). These compounds (VIII and XXII) are converted into their 4-nitro derivatives (XXIII) by the action of an alkali metal wherein $R_1$ and $R_2$ are lower alkyl, $R_6$ and $R_{11}$ are hydrogen or lower alkyl, and $R_8$ is lower alkanoyl. This sequence is of particular value for the preparation of those compounds bearing only alkyl or hydrogen substituents in the quinone ring. Thus, reaction of an appropriate alkylamine (I) with a triketone of type (XXVI) is productive of a 4-oxo-4,5,6,7-tetrahydroindole (XXVII). These compounds on treatment with a dehydrogenating agent such as palladium in boiling cumene furnish the 4-hydroxyindoles (XXVII), which are converted into the 4-acyloxyindoles (XXIX) on treatment with an alkanoyl anhydride. These acyloxyindoles (XXIX) may then be converted into their 3-formyl or 3-acyl derivatives (XXX) by any of several methods known to those skilled in the art. For example, on reaction with phosphorus oxychloride and dimethylformamide the 3-formyl derivative is obtained. After removal of the O-acyl group by treatment with base, the resulting 4-hydroxy-3-formyl or 3-acylindoles (XXXI) may be treated with an oxidizing agent, for example, Fremy's Salt, to give the corresponding 3-substituted-4,7-indoloquinones (XXXII). In the manner described previously, treatment of the 3-acyl-4,7indoloquinones (XXXII) with a reducing agent such as sodium borohydride followed by oxidation of the intermediate hydroquinone with a reagent such as ferric chloride, produces the 3-($\alpha$-hydroxyalkyl)-4,7-indoloquinone (XXXIII).

Finally, as set forth in the following reaction scheme:

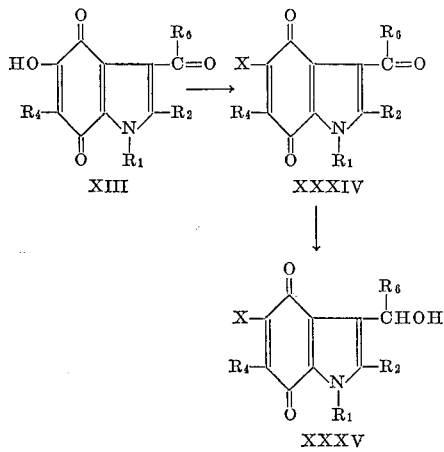

wherein $R_1$, $R_2$ and $R_4$ are lower alkyl, $R_6$ is hydrogen or lower alkyl and X is halogen, the 5-hydroxy-para-quinones (XIII), prepared as set forth in the reaction scheme in Col. 3, are valuable intermediates for the preparation of other 3-($\alpha$-hydroxyalkyl)-4,7-indoloquinones. Thus, treatment of the 5-hydroxy-para-quinones (XIII) with a halogenating reagent such as a phosphorus oxyhalide is productive of a 5-halo-para-quinone (XXXIV). On reaction with a reducing agent such as sodium borohydride and oxidation of the intermediate hydroquinone with a reagent such as ferric chloride the compounds of type XXXIV are transformed into the 5-halo-3-($\alpha$-hydroxyalkyl)-4,7-indoloquinones.

The invention will be described in greater detail in conjunction with the following specific examples.

EXAMPLE 1

*Preparation of ethyl $\beta$-ethylaminocrotonate*

With mechanical stirring a stream of ethylamine is introduced into 98.5 g. (100 ml.) of ethyl acetoacetate for 3 hrs. During the first hour cooling is required to hold the temperature at 35–40° where it is maintained throughout the reaction. Ether (200 ml.) is added, and the water is separated. The ether is removed from the organic phase and the residue is distilled under reduced pressure to give a water white liquid, B.P. 20 mm. 116–118°; $n_D^{25}$ 1.4941, 104 g.

EXAMPLE 2

*Preparation of ethyl 1-ethyl-5-hydroxy-2,6-dimethyl-3-indolecarboxylate*

A solution of 122 g. (0.0855 mole) of ethyl $\beta$-ethylaminocrotonate (Example 1) in 60 ml. of acetone is thoroughly swept with nitrogen and treated with 10.9 g. (0.0895 mole) of toluoquinone. The deep red solution is heated on the steam-bath for 2 hours, cooled in an ice-bath and filtered to give a dark solid. This material is washed with cold acetone and dried to give 4.45 g. of gray crystals. The combined filtrate and washings are concentrated to about 50 ml. volume and placed in the refrigerator for 16 hours. The solid is collected by filtration and washed with boiling light petroleum to give an additional 3.90 g. of crystals. A sample is recrystallized from dilute ethanol containing a trace of sodium hydrosulfite to give off-white crystals, M.P. 196–198°.

EXAMPLE 3

*Preparation of 1-ethyl-5-hydroxy-2,6-dimethylindole*

A mechanically stirred mixture of 50.0 g. of ethyl 1-ethyl-5-hydroxy-2,6-dimethyl-3-indolecarboxylate (Example 2) and 500 ml. of 20% hydrochloric acid solution is heated at reflux temperature for 2 hours. The acid solution is diluted with 500 ml. of water, saturated with sodium chloride and extracted well with ethyl acetate. The extracts are dried over magnesium sulfate and evaporated. The residue crystallizes from methylene chloride-petroleum ether (B.P. 30–60°) to give 26.0 g. of crystals, M.P. 113–117°. An additional 4.8 g. of crystals is obtained by concentration of the mother liquor. This material also has a crystalline modification that melts at 90–92°. Both forms have identical infrared spectra in carbon tetrachloride solution.

EXAMPLE 4

*Preparation of 1-ethyl-5-methoxy-2,6-dimethylindole*

To a magnetically stirred solution of 49.1 g. of 1-ethyl-5-hydroxy-2,6-dimethylindole (Example 3) in 300 ml. of ethyl alcohol and 600 ml. of 2 N sodium hydroxide solution is added dropwise over 90 min. at reflux temperature under nitrogen 100 g. (74 ml.) of methyl sulfate. The resulting mixture is heated at reflux temperature for an additional 60 min. and then extracted with ethyl acetate. The extract is washed with saline, dried over magnesium sulfate and evaporated. The residual brown oil is dissolved in benzene and passed through a magnesia-silica gel column (1.0 x 12.5 in.), benzene being used as the eluting solvent and 250 ml. fractions being collected. Fraction 1 contains 46.9 g. of amber oil and fraction 2 contains 1.0 g. These fractions crystalline on standing. A sample of this material is recrystallized from hexane to give white crystals, M.P. 56–57°.

EXAMPLE 5

*Preparation of 1-ethyl-5-methoxy-2,6-dimethyl-3-indolecarboxaldehyde*

To 200 ml. of magnetically-stirred, ice-chilled dimethylformamide is added dropwise at such a rate that the temperature remains at 0–5° C. 55 g. (32.8 ml.) of phosphorus oxychloride. The resulting solution is treated with a solution of 66.35 g. of 1-ethyl-5-methoxy-2,6-dimethylindole (Example 4) in 150 ml. of dimethylformamide at such a rate that the temperature does not exceed 5° C. The ice bath is removed and replaced by a warm water bath, and the mixture is stirred at 35–40° for 1.25 hr. Cracked ice (200 ml.) is added and the mixture is transferred to a 3 l. round-bottom flask containing about 300 g. of cracked ice, 200 ml. of water being used to aid in the transfer. A solution of 250 g. of sodium hydroxide in 650 ml. of water is added dropwise with mechanical stirring until about one-half of the solution has been added; the remainder of the solution is added rapidly. The resulting mixture is heated to the boiling point, diluted with water to a volume of about 2.5 l. and cooled. Filtration gives 70.5 g. of crystals, M.P. 134–136°.

EXAMPLE 6

*Preparation of 3-acetyl-1-ethyl-5-methoxy-2,6-dimethylindole*

A mechanically stirred mixture of 12.9 g. of 1-ethyl-5-methoxy-2,6-dimethylindole (Example 4) and 10 g. of sodium acetate in 300 ml. of acetic anhydride is heated at reflux temperature for 6 hours. The reaction mixture is cooled, poured onto crushed ice and stirred for 3 hours. The reaction mixture is warmed in the steam-bath and then stirred for an additional 30 minutes and then extracted with methylene chloride. The extract is successive-

9 ly washed with water, saturated sodium bicarbonate solution and finally with water. The organic solution is dried over anhydrous sodium sulfate and taken to dryness to give 14 g. of an oil. A sample of the oil is distilled and the fraction boiling at 150–170°/0.2 mm. Hg is crystallized from petroleum ether (B.P. 30–60°) to give a white solid, M.P. 88–89° C.

EXAMPLE 7

*Preparation of 1-ethyl-5-hydroxy-2,6-dimethyl-3-indolecarboxaldehyde*

A mixture of 38.4 g. of 1-ethyl-5-methoxy-2,6-dimethyl-3-indolecarboxaldehyde (Example 5) and 46.0 g. of aluminum chloride in 1 l. of xylene is mechanically stirred at reflux temperature for 5 hours. The cooled mixture is treated with cracked ice and digested to give 38.0 g. of pink solid, M.P. 246–250° dec. A sample is recrystallized from acetone to give cream-colored crystals, M.P. 256–259° dec.

EXAMPLE 8

*Preparation of 3-acetyl-1-ethyl-5-hydroxy-2,6-dimethylindole*

A mixture of 12 g. of the crude 3-acetyl-1-ethyl-5-methoxy-2,6-dimethylindole (Example 6) and 13.1 g. of aluminum chloride in 450 ml. of xylene is mechanically stirred at reflux temperature for 5 hours. The cooled mixture is treated with cracked ice and digested to give 8.2 g. of a pink solid, M.P. 250–255° C. A sample is recrystallized from acetone to give cream colored crystals, M.P. 262–265° dec.

EXAMPLE 9

*Preparation of ethyl 1-ethyl-2,6-dimethyl-4,-5dioxo-3-indolecarboxylate*

To a mechanically stirred solution of 18.0 g. of potassium nitrosodisulfonate in 400 ml. of water and 200 ml. of M/6 potassium dihydrogen phosphate is added a solution of 2.47 g. of ethyl 1-ethyl-5-hydroxy-2,6-dimethyl-3-indolecarboxylate (Example 2) in 500 ml. of acetone. The resulting brown solution becomes purple in 5–10 min. and is allowed to stand at room temperature for 16 hours. The solution is diluted with water and extracted with methylene chloride. The combined extracts are dried over magnesium sulfate and taken to dryness. The residue crystallizes upon trituration with ether. This material is crystallized from acetone-petroleum ether (B.P. 60–70°) to give, in three crops, 1,545 g. of black crystals, M.P. 115–118°.

EXAMPLE 10

*Preparation of 1-ethyl-2,6-dimethyl-4,5-dioxo-3-indolecarboxaldehyde*

To a mechanically stirred solution of 50.0 g. (0.187 mole) of potassium nitrosodisulfonate in 1440 ml. of M/6 potassium dihydrogen phosphate solution and 2510 ml. of water is added a solution of 18.75 g. (0.0864 mole) of 1 - ethyl - 5-hydroxy-2,6-dimethyl-3-indolecarboxaldehyde (Example 7) in 3950 ml. of hot acetone. Some solid separates, and an additional 400 ml. of acetone is added. The initially blue solution turns brown on addition of the aldehyde and becomes purple within 5 min. Stirring is continued at room temperature for 1 hour. The reaction mixture is then concentrated under reduced pressure, 3200 ml. of distillate being collected. The concentrate is chilled and filtered. The residue is washed well with water and air-dried to give 16.05 g. of black needles, M.P. 205–208°. A sample is recrystallized from acetone-hexane to give black needles, M.P. 214–216°.

EXAMPLE 11

*Preparation of 3-acetyl-1-ethyl-2,6-dimethyl-4,5-dioxoindole*

To a mechanically stirred solution of 2.05 g. of potassium nitrosodisulfonate in 153 ml. of M/6 potassium dihydrogen phosphate solution and 300 ml. of water is added a solution of 295 mg. of 3-acetyl-1-ethyl-5-hydroxy-2,6-dimethylindole (Example 8) in 300 ml. of hot acetone. The initially blue solution turns brown on addition of the indole and becomes purple within 30 minutes. Stirring is continued at room temperature for 4 hours. The solution is diluted with an equal volume of water and extracted with methylene chloride. The combined extracts are washed with saline, dried over anhydrous sodium sulfate and concentrated to small volume and filtered. The filtrate is evaporated with concomitant addition of petroleum ether (30–60°). Once crystallization begins, the mixture is cooled. Filtration gives 176 mg. of dark brown solid, M.P. 162–165° C. A sample is recrystallized from methylene chloride-petroleum ether (30–60°) to give dark brown needles, M.P. 164–166° C.

EXAMPLE 12

*Preparation of ethyl 1-ethyl-4,5,7-trihydroxy-2,6-dimethyl-3-indolecarboxylate triacetate*

To a solution of 400 mg. of ethyl 1-ethyl-2,6-dimethyl-4,5-dioxo-3-indolecarboxylate (Example 9) in 6 ml. of acetic anhydride is added 0.125 ml. of boron trifluoride etherate; the purple solution immediately turns brown. It is kept at room temperature for 1 hour, and then poured onto cracked ice. After the excess acetic anhydride hydrolyzes, the mixture is extracted with methylene chloride. The extract is taken to dryness, and the amorphous residue crystallizes with ether to give 450 mg. of crystals, M.P. 155–158°. Two recrystallizations from acetone-petroleum ether (B.P. 60–70°) give white crystals, M.P. 157–159°.

EXAMPLE 13

*Preparation of 1-ethyl-4,5,7-trihydroxy-2,6-dimethyl-3-indolecarboxaldehyde triacetate*

To a magnetically stirred mixture of 10.00 g. (43.3 moles) of 1-ethyl-2,6-dimethyl-4,5-dioxo-3-indolecarboxaldehyde (Example 10) in 150 ml. of acetic anhydride is added 2 ml. of boron trifluoride etherate. All solid quickly dissolves and the purple mixture becomes brown and is stirred at room temperature for 1 hour. Cracked ice is added, and the mixture is stirred at room temperature until the excess acetic anhydride hydrolyzes. The resulting solid is collected by filtration and washed with water to give 12.5 g. of grey solid, M.P. 173–180°. A sample is recrystallized from acetone-hexane to give white crystals, M.P. 194–195°.

EXAMPLE 14

*Preparation of 4,5,7-triacetoxy-3-acetyl-1-ethyl-2,6-dimethylindole enol acetate*

To a magnetically stirred mixture of 657 mg. of 3-acetyl-1-ethyl-2,6-dimethyl-4,5-dioxoindole (Example 11) in 8 ml. of acetic anhydride is added 0.2 ml. of boron trifluoride etherate. The solid dissolves and the purple mixture becomes dark brown and is stirred at room temperature for several hours. Cracked ice is added, and the mixture is stirred until the excess acetic anhydride hydrolyzes. The resulting solid is collected by filtration and washed with water to give 888 mg. of brown solid. The crude material is triturated with cold methanol to give 467 mg. of a yellow solid, M.P. 195–200° C.

EXAMPLE 15

*Preparation of 1-ethyl-5-hydroxy-2,6-dimethyl-4,7-dioxo-3-indolecarboxylic acid*

A mixture of 2.55 g. of ethyl 1-ethyl-4,5,7-trihydroxy-2,6-dimethyl-3-indolecarboxylate triacetate (Example 12) in 100 ml. of water and 20 ml. of 25% sodium hydroxide solution is heated at reflux temperature in an atmosphere of nitrogen with magnetic stirring for 30 minutes. The undissolved solid is collected by filtration to give 0.489 g. of solid. The filtrate is treated with a stream of air for 30 minutes. This purple solution is acidified by dropwise addition of concentrated hydrochloric acid solution, and the resulting solution is extracted with methylene chloride. The extract is taken to dryness and the residue is crystallized from methylene chloride-petroleum ether (B.P. 60–70°) to give 1.010 g. of red needles, M.P. 220–223°.

EXAMPLE 16

*Preparation of 1-ethyl-5-hydroxy-2,6-dimethyl-4,7-dioxo-3-indolecarboxaldehyde*

A mechanically stirred mixture of 30.10 g. (0.080 mole) of 1-ethyl-4,5,7-trihydroxy-2,6-dimethyl-3-indolecarboxaldehyde triacetate (Example 13) in 500 ml. of water and 125 ml. of 25% sodium hydroxide solution is heated at reflux temperature under nitrogen for 1 hour. All solid dissolves and the brown solution is quickly filtered. A stream of air is passed through the filtrate for 35 minutes. The resulting purple solution is acidified by addition of 37% hydrochloric acid solution. Once acid, a red solid separates from the solution. It is extracted into methylene chloride and the extracts are dried over magnesium sulfate and evaporated with concomitant addition of petroleum ether (B.P. 30–60°). Once crystallization begins, the mixture is placed in the refrigerator. Filtration gives 13.6 g. of rose needles, M.P. 213–215°. Concentration of the filtrate gives an additional 2.9 g. of this quinone.

EXAMPLE 17

*Preparation of 3-acetyl-1-ethyl-5-hydroxy-2,6-dimethyl-4,7-dioxoindole*

A magnetically stirred mixture of 53 mg. of 4,5,7-triacetoxy-3-acetyl-1-ethyl-2,6-dimethyl indole enol acetate (Example 14) in 3 ml. of water and 0.4 ml. of 25% sodium hydroxide solution is heated at reflux temperature, under nitrogen, until solution occurs. The reaction mixture is filtered and a stream of air is passed through the filtrate for 40 minutes. The resulting purple solution is acidified by addition of 37% hydrochloric acid solution. The acid solution is extracted with methylene chloride and the extracts washed with water. The organic solution is dried over anhydrous sodium sulfate and taken to dryness. The residue is recrystallized from methylene chloride-petroleum ether (30–60°) to give 11 mg. red crystals, M.P. 172–175° C.

EXAMPLE 18

*Preparation of methyl 1-ethyl-5-methoxy-2,6-dimethyl-4,7-dioxo-3-indolecarboxylate*

A magnetically stirred mixture of 681 mg. of 1-ethyl-5-hydroxy-2,6-dimethyl-4,7-dioxo-3-indolecarboxylic acid, 5.5 g. of potassium carbonate and 11 ml. of dimethyl sulfate in 250 ml. of acetone is heated at reflux temperature for 45 minutes and then stirred at room temperature for 2 hours. The mixture is filtered and the residue is washed well with acetone. The combined filtrate and washings are concentrated, most of the excess alkylating agent being removed on the steam-bath at water-pump pressure. The residue crystallizes from dilute acetone to give 490 mg. of orange crystals, M.P. 82–83°.

EXAMPLE 19

*Preparation of 1-ethyl-5-methoxy-2,6-dimethyl-4,7-dioxo-3-indolecarboxaldehyde*

A mechanically stirred mixture of 21.9 g. (0.089 mole) of 1-ethyl-5-hydroxy-2,6-dimethyl-4,7-dioxo-3-indolecarboxaldehyde (Example 16) 100 g. of potassium carbonate and 6.75 g. of dimethyl sulfate in 1 l. of acetone is heated at reflux temperature for 1 hour, whereafter stirring is continued at room temperature for 3 hours. The mixture is filtered and the residue is washed well with acetone. The combined filtrate and washings are evaporated, the excess dimethyl sulfate being removed at oil-pump pressure. The residue is dissolved in 200 ml. of acetone and treated, with magnetic stirring, with about 800 ml. of water. Stirring is continued for 30 minutes, and the resulting mixture is chilled and filtered to furnish 18.9 g. of needles, M.P. 124–127°. For purification this material is dissolved in methylene chloride and passed through a magnesia-silica gel column, methylene chloride being used as a wash solvent. The eluate is essentially colorless after 2.5 l. is collected. The solvent is removed and the residue is crystallized from methylene chloride-petroleum ether (B.P. 30–60°) to give 15.08 g. of red needles, M.P. 133–135°.

EXAMPLE 20

*Preparation of 5-ethoxy-1-ethyl-2,6-dimethyl-4,7-dioxo-3-indolecarboxaldehyde*

1-ethyl-5-hydroxy-2,6-dimethyl-4,7-dioxo-3-indolecarboxaldehyde (1.0 g.) (Example 16) in tetraethoxymethane is heated at reflux temperature for 3 hours. The mixture is distilled almost to dryness. Methanol (4 ml.) is added and red-orange crystals precipitate. These are collected and washed with methanol to give orange-red needles, M.P. 117–119°.

EXAMPLE 21

*Preparation of 3-acetyl-1-ethyl-5-methoxy-2,6-dimethyl-4,7-dioxoindole*

A magnetically stirred mixture of 163 mg. of 3-acetyl-1-ethyl-5-hydroxy-2,6-dimethyl-4,7-dioxoindole (Example 17), 1.6 g. of potassium carbonate and 4 ml. of dimethyl sulfate in 93 ml. of acetone is heated at reflux temperature for 45 minutes and then stirred at room temperature for 2 hours. The mixture is filtered and the residue washed with acetone. The combined filtrate and washings are concentrated, most of the excess alkylating agent being removed on the steam bath at reduced pressure. The residue is dissolved in a minimum amount of benzene and placed on a Florasil column, ether being used as a wash solvent. The combined washings are concentrated to dryness and the residue is recrystallized from methylene chloride-petroleum ether (30–60°) to give 91 mg. of orange crystals, M.P. 126–127° C.

EXAMPLE 22

*Preparation of 1-ethyl-3-hydroxymethyl-5-methoxy-2,6-dimethyl-4,7-dioxoindole*

To a magnetically stirred solution of 334 mg. (1.15 mmoles) of methyl 1-ethyl-5-methoxy-2,6-dimethyl-4,7-dioxo-3-indolecarboxylate (Example 18) in 25 ml. of tetrahydrofuran is added 197 mg. (5.2 mmoles) of lithium aluminum hydride. The resulting colorless mixture is heated at reflux temperature for 1 hour. Ethereal ferric chloride (1.0 g. in 20 ml.) is slowly added followed by the cautious addition of ethyl acetate and then water. The resulting mixture is distributed between ethyl acetate and water. The organic solution is washed with saline, dried over magnesium sulfate and taken to dryness to give 314 mg. of oil. This material is subjected to chromatography on diatomaceous earth using a n-heptane:ethyl acetate: methanol:water (90:10:17:4) system. Removal of the solvent from HBV 3.1-4.2 gives red crystals having melting point 85–87°.

EXAMPLE 23

*Preparation of 1-ethyl-3-hydroxymethyl-5-methoxy-2,6-dimethyl-4,7-dioxoindole*

A magnetically stirred solution of 500 mg. (1.38 mmoles) of 1-ethyl-5-methoxy-2,6-dimethyl-4,7-dioxo-3-indolecarboxaldehyde (Example 19) in 150 ml. of methanol is swept with a stream of nitrogen, heated to reflux temperature and treated with 500 mg. of sodium borohydride. Boiling is continued for 2–3 minutes, and the solution is then stirred under nitrogen at room temperature for 1 hour. Acetone (5 ml.) is added followed by 5 ml. of a 1 N ferric chloride in 0.1 N hydrochloric acid solution. The resulting mixture is distributed between methylene chloride and water. The aqueous layer is extracted an additional two times with methylene chloride. The combined extracts are washed with saline, dried over magnesium sulfate and evaporated. The residue crystallizes from methylene chloride-petroleum ether (B.P. 30–60°) to give 377 mg. of red needles, M.P. 85.5–86.5°.

EXAMPLE 24

*Preparation of 5-ethoxy-1-ethyl-3-hydroxymethyl-2,6-dimethyl-4,7-dioxoindole*

In the manner described in Example 23 treatment of 5-ethoxy - 1 - ethyl-2,6 - dimethyl-4,7-dioxo-3-indolecarboxaldehyde (Example 20) with sodium borohydride in methanol and oxidation of the resulting hydroquinone with ferric chloride is productive of orange needles, M.P. 65–70°.

EXAMPLE 25

*Preparation of 1-ethyl-3-(1'-hydroxyethyl)-5-methoxy-2,6-dimethyl-4,7-dioxoindole*

A magnetically stirred solution of 100 mg. of 3-acetyl-1-ethyl-5-methoxy-2,6-dimethyl-4,7-dioxoindole (Example 21) in 10 ml. of methanol is heated to reflux and 100 mg. of sodium borohydride is added under nitrogen. The resulting mixture is heated for 1 to 2 minutes and then allowed to stir for 1 hour at room temperature. To the solution is added 1 ml. of acetone, and after 5 minutes, followed by 1 ml. of 1 N ferric chloride in 1 N hydrochloric acid solution. The resulting mixture is distributed between methylene chloride and water. The organic solution is washed with saline, dried over anhydrous sodium sulfate and taken to dryness to give a reddish oil.

EXAMPLE 26

*Preparation of 2,5-dimethyl-4-nitroanisole*

A well stirred suspension of 16.7 g. (0.1 mole) of 2,5-dimethyl-4-nitrophenol (R. L. Datta and P. S. Varma, J. Am. Chem. Soc., 41, 2040 (1919) in 50 ml. of water at 40–45° is treated alternately and in portions with a solution of 7.0 g. of sodium hydroxide in 18 ml. of water and 12 ml. of methyl sulfate. After 2 hours the mixture is filtered, and the solid is recrystallized from dilute methanol to give 14.5 g. (80% yield) of needles, M.P. 90–92°.

EXAMPLE 27

*Preparation of 5-methoxy-4-methyl 2-nitrophenylpyruvic acid*

Ethanol (6.25 ml.) is added to a mechanically stirred slurry of 2.15 g. (0.055 g.-atoms) of potassium in benzene. After all of the potassium reacts, the solvents are removed by distillation, benzene (50 ml.) is added and removed in the same manner. The cooled residue is slurried in 100 ml. of ether and treated with 7.3 g. (0.05 mole, 6.75 ml.) of ethyl oxalate. To the resulting solution is added a solution of 9.05 g. (0.05 mole) of 2,5-dimethyl-4-nitroanisole (Example 26) in 150 ml. of ether. A red solid separates immediately and the mixture is mechanically stirred at room temperature for 18 hours and then at reflux temperature for 4 hours. The mixture is filtered, and the solid is washed with ether. The residue is dissolved in water and the solution is heated on the steam bath for 30 minutes. The solution is cooled and extracted with ether. The aqueous solution is acidified wtih hydrochloric acid and filtered to give 6.123 g. of crystals, M.P. 167–170°.

EXAMPLE 28

*Preparation of 5-methoxy-6-methyl-2-indolecarboxylic acid*

A solution of 42.0 g. (0.166 mole) of 5-methoxy-4-methyl-2-nitrophenylpyruvic acid (Example 27) in 230 ml. of 17% ammonium hydroxide and 115 ml. of water is treated with a hot solution of 300 g. of ferrous sulfate heptahydrate in 340 ml. of water. The mixture is mechanically stirred at steam bath temperature for 1 hour and then allowed to cool to room temperature and filtered.

The residue is washed with dilute ammonium hydroxide until a test portion becomes only milky on acidification. The combined filtrate and washings are acidified with hydrochloric acid and the solid which separates is collected by filtration. The moist solid is recrystallized from dilute acetic acid to give 19.0 g. (56% yield) of light brown solid, M.P. 240–242° (gas evolution).

EXAMPLE 29

*Preparation of 5-methoxy-6-methylindole*

5-methoxy-6-methyl-2-indolecarboxylic acid (Example 28) (3.61 g., 17.6 mmoles) is heated at 260–270° until the melt becomes quiescent and then taken to and held briefly at 300°. The cooled material is dissolved in ether, and this solution is washed with sodium carbonate solution, treated with activated carbon, dried over magnesium sulfate and taken to dryness. The solid is recrystallized from ether-petroleum ether to give 2.12 g. of crystals, M.P. 119–120°.

EXAMPLE 30

*Preparation of 5-methoxy-6-methyl-3-indolecarboxaldehyde*

To 3.5 ml. of dimethylformamide is added with magnetic stirring and ice cooling 1.69 g. (11 mmoles, 1 ml.) of phosphorus oxychloride. To this solution is then added dropwise a solution of 1.61 g. (10 mmoles) of 5-methoxy-6-methylindole (Example 29) in 8 ml. of dimethylformamide. The temperature of the reaction is kept below 10° C. during the addition which requires 20 minutes. A solid separates 15 minutes after the start of the addition. Upon completion of the addition, the ice bath is removed and replaced by a warm water bath. The paste is kept at 30–35° C. with magnetic stirring for 45 minutes. Crushed ice is added to the mixture which is then treated with a solution of 4.5 g. of sodium hydroxide in 20 ml. of water. The mixture is brought to boiling and then chilled in an ice bath to give 1.74 g. of tan solid, M.P. 192–195°.

EXAMPLE 31

*Preparation of 1-ethyl-5-methoxy-6-methyl-3-indolecarboxaldehyde*

A mixture of 1.74 g. (9.2 mmoles) of 5-methoxy-6-methyl-3-indolecaraboxaldehyde (Example 30) and 30 ml. of 40% potassium hydroxide solution is heated with mechanical stirring on the steam bath. When the mixture becomes hot, all solid dissolves and 10.0 g. (65 mmoles, 8.5 ml.) of ethyl sulfate is added in five equal portions over 1 hour. The solution is allowed to cool, whereon crystals separate from the aqueous solution. The mixture is extracted with ethyl acetate, and the extract is washed with saline, dried over magnesium sulfate and evaporated. The residue crystallizes from ether-petroleum ether (B.P. 30–60°) to give 1.287 g. of crystals, M.P. 92–94°.

EXAMPLE 32

*Preparation of 1-ethyl-5-methoxy-6-methyl-4-nitro-3-indolecarboxaldehyde*

To an ice chilled, magnetically stirred solution of 1.085 g. (5.0 mmoles) of 1-ethyl-5-methoxy-6-methyl-3-indolecarboxaldehyde (Example 31) in 12 ml. of concentrated sulfuric acid is added dropwise over 30 minutes a solution of 0.425 g. (5.0 mmoles) of sodium nitrate in 7 ml. of concentrated sulfuric acid. The resulting solution is stirred for an additional 45 minutes and then poured onto a cracked ice-water mixture. The solid is extracted into methylene chloride and the extract is washed to neutrality with saline, dried with magnesium sulfate and evaporated. The residue is crystallized from acetone-hexane to give 525 mg. of light yellow solid, M.P. 150–152°.

EXAMPLE 33

*Preparation of 1-ethyl-5-methoxy-2,6-dimethyl-4-nitro-3-indolecarboxaldehyde*

In the manner described in Example 32 treatment of 1-ethyl-5-methoxy-2,6 - dimethyl-3-indolecarboxaldehyde (Example 5) with sodium nitrate in sulfuric acid produces orange crystals, M.P. 155–157°.

EXAMPLE 34

*Preparation of 1-ethyl-3-hydroxymethyl-5-methoxy-6-methyl-4,7-dioxoindole*

A mixture of 532 mg. (2.06 mmoles) of 1-ethyl-5-methoxy-6-methyl-4-nitro - 3 - indolecarboxaldehyde (Example 32) and 105 mg. of a 10% palladium-on-charcoal catalyst in 100 ml. of ethanol containing 1 ml. of water is shaken under hydrogen for 1 hour and 45 minutes. A pressure drop corresponding to 4 molar equivalents of hydrogen is observed. The mixture is filtered to give an ethanolic solution of 4-amino-1-ethyl-3-hydroxymethyl-6-methyl-5-methoxyindole.

The above solution is added with magnetic stirring to a solution of 5.60 g. of potassium nitrodisulfonate in 40 ml. of water and 120 ml. of M/6 potassium dihydrogen phosphate solution. The blue color is immediately discharged and within 10 minutes an orange color develops. Stirring is continued for 80 minutes, and the solution is diluted with water and extracted thrice with methylene chloride. The organic solution is dried over magnesium sulfate and evaporated. The residue crystallizes from ether-petroleum ether (B.P. 30–60°) to give 149 mg. of orange needles, M.P. 78–81°.

EXAMPLE 35

*Preparation of 1-ethyl-3-hydroxymethyl-5-methoxy-2,6-dimethyl-4,7-dioxoindole*

In the manner described in Example 34 a solution of 1-ethyl-5-methoxy-2,6 - dimethyl-4-nitro-3-indolecarboxaldehyde (Example 33) in ethanol is treated with hydrogen in the presence of a 10% paladium-on-charcoal catalyst to give an alcoholic solution of 4-amino-1-ethyl-3-hydroxymethyl-5-methoxy-2,6-dimethylindole.

Oxidation of this substance with potassium nitrosodisulfonate in the manner described in Example 34 produces red-orange needles, M.P. 85–87°.

EXAMPLE 36

*Preparation of 1-ethyl-4,5,6,7-tetrahydro-2-methyl-4-oxoindole*

A mixture of 33 g. of 2-acetonyl-1,3-cyclohexanedione [H. Stetter and R. Lauterbach, Ann. 652, 43 (1962)], 20 g. of ethyl amine and 135 ml. of ethanol is heated in a steel bomb at 150° for 12 hours. The methanol is removed by concentration at reduced pressure and the residual mixture is heated with 200 ml. of methylene chloride and 400 ml. of water. The organic layer is washed two times with 5% sodium hydroxide solution, once with water, then dried and concentrated. The crystalline residue is washed with cyclohexane containing a small amount of ether. Recrystallization of this residue from cyclohexane affords 18.8 g. of 1-ethyl-4,5,6,7-tetrahydro-2-methyl-4-oxoindole, M.P. 74–75°.

EXAMPLE 37

*Preparation of 1-ethyl-4-hydroxy-2-methylindole*

A mixture of 10.5 g. of 1-ethyl-4,5,6,7-tetrahydro-2-methyl-4-oxoindole (Example 36), 2.5 g. of 10% palladium-on-charcoal and 50 ml. of cumene is heated at reflux temperature for 3 hours, then cooled and filtered. The filtrate is extracted with 100 ml. of 5% sodium hydroxide solution and this extract is layered with methylene chloride and carefully neutralized with acetic acid. The methylene chloride layer is washed with sodium bicarbonate solution, dried and concentrated and the residue is extracted with 500 ml. of boiling n-hexane. White crystals of 1-ethyl-4-hydroxy-2-methyl-indole form on cooling the extract. They have M.P. 98–102°.

EXAMPLE 38

*Preparation of 4-acetoxy-1-ethyl-2-methylindole*

A solution of 4.0 g. (22.4 mmole) of 1-ethyl-4-hydroxy-2-methylindole (Example 37) in 75 ml. of water containing 1.35 g. (33.3 mmole) of sodium hydroxide is treated with 3.4 g. (33.3 mmole) of acetic anhydride and 3.0 g. (33.3 mmole) of sodium acetate After 20 minutes the mixture is filtered and the solid is dissolved in methylene chloride. This solution is washed two times with sodium bicarbonate solution, dried and concentrated and the dark oily residue is extracted with 40 ml. of boiling n-hexane. On cooling, this extract first gives an oil. The mother liquor is decanted from this oil, affording on further cooling 4-acetoxy-1-ethyl-2-methylindole, white crystals, M.P. 71–73°.

EXAMPLE 39

*Preparation of 4-acetoxy-1-ethyl-2-methyl-3-indolecarboxaldehyde*

To an ice-cooled mixture of 2.0 g. (13.7 mmole) of phosphorous oxychloride and 15 ml. of N,N-dimethylformamide is added dropwise a solution of 3.20 g. (13.7 mmole) of 4-acetoxy-1-ethyl-2-methylindole (Example 38) in 15 ml. of N,N-dimethylformamide. After 90 minutes the resulting yellow solution is poured onto a mixture of ice and 10% sodium carbonate solution. The crystalline solid that forms is washed well with water, dissolved in methylene chloride, washed with sodium bicarbonate solution, dried and concentrated under reduced pressure. Crystallization of the residue from methanol affords white needles, M.P. 165–168°.

EXAMPLE 40

*Preparation of 1-ethyl-4-hydroxy-2methyl-3-indolecarboxaldehyde*

A mixture of 3.14 g. (12 mmole) of 4-acetoxy-1-ethyl-2-methyl-3-indolecarboxaldehyde (Example 39) 200 ml. of methanol and 60 ml. of 5% sodium hydroxide solution is stirred and gently warmed until all solid dissolves. It is then cooled, diluted with 200 ml. of water and carefully neutralized with acetic acid. The precipitate that forms is washed well with water, dissolved in methylene chloride solution, washed with sodium bicarbonate solution, dried and concentrated under reduced pressure. Crystallization of the residue from methanol with charcoal decolorization affords 1.16 g. of white needles, M.P. 169–170°.

EXAMPLE 41

*Preparation of 1-ethyl-2-methyl-4,7-dioxo-3-indolecarboxaldehyde*

To a stirred solution of 1.98 g. (7.4 mmole) of potassium nitrosodisulfonate in 180 ml. of M/18 potassium dihydrogen phosphate is added a hot solution of 375 mg. (1.85 mmole) of 1-ethyl-4-hydroxy-2-methyl-3-indolecarboxaldehyde (Example 40) in 50 ml. of acetone. The mixture is stirred at 40° for 10 minutes, then treated with an additional 990 mg. (3.7 mmole) of potassium nitrosodisulfonate in 60 ml. of M/18 potassium dihydrogen phosphate and 40 ml. of hot acetone. After 30 minutes the mixture is cooled, diluted with 400 ml. of water, filtered, and the filtrate is extracted with methylene chloride. This extract is washed with water, dried and concentrated. The residue is extracted with ether and this extract is filtered and concentrated. The residue is dissolved in acetone and passed through a column of magnesia-silica gel (10 x 200 mm.). Concentration of the orange eluate affords 296 mg. of orange prisms, M.P. 123–155°. Recrystallization from acetone-hexane raises the melting point to 148–155°.

EXAMPLE 42

*Preparation of 1-ethyl-3-hydroxymethyl-2-methyl-4,7-dioxoindole*

A solution of 675 mg. (3.1 mmole) of 1-ethyl-2-methyl-4,7-dioxo-3-indolecarboxaldehyde (Example 41) in 110 ml. of degassed methanol is treated with a solution of 650 mg. of sodium borohydride in 10 ml. of methanol and the mixture is warmed on a steam bath to reflux temperature, then allowed to stir and cool for one hour. Acetone (15 ml.) is added and after 5 minutes the mixture is treated with 15 ml. of 0.1 N hydrochloric acid containing 2.1 g. (7.8 mmole) of ferric chloride hexahydrate. This mixture is poured into 500 ml. of water and extracted with 400 ml. of methylene chloride. This extract is washed two times with water, dried and concentrated under reduced pressure. The red semi-solid product is dissolved in 10 ml. of the upper phase and 10 ml. of the lower phase of the system heptane: ethyl acetate: methanol:water (50:50:15:6), mixed with 20 g. of diatomaceous earth and packed atop a column of 250 g. of diatomaceous earth and 125 ml. of the lower phase. On elution of the column with the upper phase, two orange bands appear, are eluted and concentrated. The second band contains 1-ethyl-3-hydroxymethyl-2-methyl-4,7-indolequinone which is obtained as a red crystalline solid M.P. 75–100°.

EXAMPLE 43

*Preparation of 5-chloro-1-ethyl-2,6-dimethyl-4,7-dioxo-3-indolecarboxaldehyde*

To an ice-cooled mixture of 1.22 g. (8 mmole) of phosphorous oxychloride and 4 ml. of N,N-dimethylformamide is added a solution of 988 mg. (4 mmole) of 1-ethyl-5-hydroxy - 2,6-dimethyl-4,7-dioxo-3-indolecarboxaldehyde (Example 16) in 12 ml. of dimethylformamide. The mixture is heated on a steam bath for 30 minutes, cooled, poured onto ice and treated with methylene chloride and 5% sodium bicarbonate solution. The organic layer is washed with 5% sodium bicarbonate solution, dried and concentrated under reduced pressure. The residue is dissolved in 90% methylene chloride-10% acetone and passed through a magnesia-silica gel column (24 times 120 mm.). Concentration of the orange eluate affords orange prisms, M.P. 145–150°.

EXAMPLE 44

*5-chloro-1-ethyl-3-hydroxymethyl-2,6-dimethyl-4,7-dioxoindole*

A solution of 28 mg. (0.11 mmole) of 5-chloro-1-ethyl-2,6-dimethyl-4,7-dioxo-3-indolecarboxaldehyde (Example 43) in 2 ml. of degassed ethanol is treated under nitrogen with a solution of 30 mg. (0.79 mmole) of sodium borohydride in 1 ml. of ethanol and the mixture is heated briefly at reflux temperature. It is then stirred at ambient temperature 1 hour and treated with 1 ml. of acetone to destroy excess borohydride. A solution of 80 mg. (0.3 mmole) of ferric chloride hexahydrate in 2 ml. of 0.1 N hydrochloric acid is added and the mixture is poured into water and methylene chloride. The methylene chloride layer is washed two times with water, dried and concentrated. Addition of a few drops of methanol causes the residue to crystallize, affording orange prisms, M.P. 110–117°.

EXAMPLE 45

*Preparation of 1-ethyl-3-hydroxymethyl-5-methoxy-2,6-dimethyl-4,7-dioxoindole acetate*

A solution of 150 mg. of 1-ethyl-3-hydroxymethyl-5-methoxy-2,6-dimethyl-4,7-dioxoindole (Example 23) in 3 ml. of pyridine is treated with 0.3 ml. of acetic anhydride and kept at room temperature for 16.5 hours. Water is added, and the precipitated solid is collected by filtration and recrystallized from acetone-hexane to give orange needles, M.P. 144–145°.

EXAMPLE 46

*Preparation of 1-ethyl-3-(α-hydroxyethyl)-5-methoxy-2,6-dimethyl-4,7-dioxoindole acetate*

In the manner described in Example 45 treatment of 1 - ethyl-3-(1'-hydroxyethyl)-5-methoxy-2,6-dimethyl-4,7-dioxoindole (Example 25) in pyridine with acetic anhydride is productive of this ester.

EXAMPLE 47

*Preparation of 1-ethyl-3-hydroxymethyl-2-methyl-4,7-dioxoindole acetate*

In the manner described in Example 45 treatment of 1 - ethyl - 3-hydroxymethyl-2-methyl-4,7-dioxoindole (Example 42) with acetic anhydride in pyridine is productive of the acetate ester.

EXAMPLE 48

*Preparation of 1-ethyl-3-hydroxymethyl-5-methoxy-2,6-dimethyl-4,7-dioxoindole propionate*

In the manner described in Example 45 treatment of 1 - ethyl-3-hydroxymethyl-5-methoxy-2,6-dimethyl-4,7-dioxoindole (Example 23) with propionic anhydride in pyridine gives orange needles, M.P. 127–128°.

EXAMPLE 49

*Preparation of 1-ethyl-3-hydroxymethyl-5-methoxy-2,6-dimethyl-4,7-oxoindole isobutyrate*

In the manner described in Example 45 treatment of 1 - ethyl-3-hydroxymethyl-5-methoxy-2,6-dimethyl-4,7-dioxoindole (Example 23) with isobutyric anhydride in dine produces orange crystals, M.P. 139–141°.

EXAMPLE 50

*Preparation of 1-ethyl-3-hydroxymethyl-5-methoxy-2,6-dimethyl-4,7-dioxoindole benzoate*

In the manner described in Example 45 treatment of 1 - ethyl-3-hydroxymethyl-5-methoxy-2,6-dimethyl-4,7-dioxoindole (Example 23) with benzoyl chloride in pyridine produces orange crystals, M.P. 139–141°.

EXAMPLE 51

*Preparation of 1-ethyl-3-hydroxymethyl-5-methoxy-2,6-dimethyl-4,7-dioxoindole hexahydrobenzoate*

In the manner described in Example 45 treatment of 1 - ethyl-3-hydroxymethyl-5-methoxy-2,6-dimethyl-4,7-dioxoindole (Example 23) with cyclohexanecarbonyl chloride in pyridine produces orange needles, M.P. 127–128°.

EXAMPLE 52

*Preparation of 1-ethyl-3-hydroxymethyl-5-methoxy-2,6-dimethyl-4,7-dioxoindole phenoxyacetate*

In the manner described in Example 45 treatment of 1 - ethyl-3-hydroxymethyl-5-methoxy-2,6-dimethyl-4,7-dioxoindole (Example 23) with phenoxyacetyl chloride in pyridine affords orange crystals, M.P. 96–98°.

EXAMPLE 53

*Preparation of 1-ethyl-3-hydroxymethyl-5-methoxy-2,6-dimethyl-4,7-dioxoindole 2-furanoate*

In the manner described in Example 45 treatment of 1 - ethyl-3-hydroxymethyl-5-methoxy-2,6-dimethyl-4,7-dioxoindole (Example 23) with 2-furanoyl chloride in pyridine furnishes red crystals, M.P. 156–157°.

EXAMPLE 54

*Preparation of 1-ethyl-3-hydroxymethyl-5-methoxy-2,6-dimethyl-4,7-dioxoindole cinnamoate*

In the manner described in Example 45 treatment of 1 - ethyl-3-hydroxymethyl-5-methoxy-2,6-dimethyl-4,7-dioxoindole (Example 23) with cinnamoyl chloride in pyridine produces orange crystals, M.P. 123–123.5°.

EXAMPLE 55

*Preparation of 1-ethyl-3-hydroxymethyl-5-methoxy-2,6-dimethyl-4,7-dioxoindole crotonate*

In the manner described in Example 45 treatment of 1 - ethyl-3-hydroxymethyl-5-methoxy-2,6-dimethyl-4,7-dioxoindole (Example 23) with crotonyl chloride in pyridine produces orange crystals, M.P. 117–119°.

EXAMPLE 56

*Preparation of 1-ethyl-3-hydroxymethyl-5-methoxy-2,6-dimethyl-4,7-dioxoindole O-acetylmandelate*

In the manner described in Example 45 treatment of 1 - ethyl-3-hydroxymethyl-5-methoxy-2,6-dimethyl-4,7-dioxoindole (Example 23) with O-acetylmandelic chloride in pyridine gives orange crystals, M.P. 100–101°.

EXAMPLE 57

*Preparation of 1-ethyl-3-hydroxymethyl-5-methoxy-2,6-dimethyl-4,7-dioxoindole phenylacetate*

In the manner described in Example 45 treatment of 1 - ethyl-3-hydroxymethyl-5-methoxy-2,6-dimethyl-4,7-dioxoindole (Example 23) with phenylacetyl chloride in pyridine gives orange needles.

EXAMPLE 58

*5-chloro-1-ethyl-3-hydroxymethyl-2,6-dimethyl-4,7-dioxoindole acetate*

A solution of 16 mg. (0.058 mmole) of 5-chloro-1-ethyl-3-hydroxymethyl-2,6-dimethyl-4,7-dioxoindole (Example 44) in 2 ml. of pyridine is treated with 0.2 ml. acetic anhydride. After 21 hours at ambient temperature the mixture is poured onto ice. The orange solid that forms is washed with water, dissolved in methylene chloride, washed water, dried and concentrated. Treatment of the residue with a few drops of methanol gives orange prisms, M.P. 133–147°.

EXAMPLE 59

*Preparation of 1-ethyl-3-hydroxymethyl-2-methyl-4,7-dioxoindole acetate*

In the manner described in Example 45 treatment of 1-ethyl-3-hydroxymethyl-2-methyl-4,7-dioxoindole (Example 42) with acetic anhydride in pyridine is productive of this ester.

EXAMPLE 60

*Preparation of 1-ethyl-3-hydroxymethyl-2-methyl-4,7-dioxoindole acetate*

A mixture of 8 mg. of 1-ethyl-3-hydroxymethyl-2-methyl-4,7-dioxoindole (Example 42), 100 mg. of sodium acetate and 1.0 ml. of acetic anhydride is heated on a steam bath for 1.5 hours. It is then cooled and poured onto a mixture of ice and 5% sodium bicarbonate solution. When the excess acetic anhydride has hydrolyzed, the mixture is extracted with methylene chloride. This extract is washed with sodium bicarbonate solution, dried and concentrated. Trituration of the residue with hexane affords crystals, M.P. 103–105°.

What is claimed is:

1. A member of the class consisting of 3-(α-acyloxy-lower alkyl)-4,7-indoloquinones of the formula:

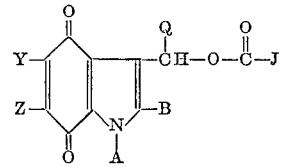

wherein A is lower alkyl; B, Q and Z are each selected from the group consisting of hydrogen and lower alkyl; Y is selected from the group consisting of hydrogen, chlorine, bromine and lower alkoxy; and J is selected from the group consisting of lower alkyl, lower cycloalkyl of from 5 to 6 carbon atoms, phenyl, phenyl lower alkyl, α-lower alkanoyloxy phenyl lower alkyl, phenoxymethyl, 2-furyl, lower alkenyl and phenyl lower alkenyl.

2. 1 - ethyl-3-hydroxymethyl-5-methoxy-2,6-dimethyl-4,7-dioxoindole acetate.

3. 1 - ethyl-3-hydroxymethyl-5-methoxy-2,6-dimethyl-4,7-dioxoindole hexahydrobenzoate.

4. 1 - ethyl-3-hydroxymethyl-5-methoxy-2,6-dimethyl-4,7-dioxoindole cinnamoate.

5. 1 - ethyl-3-hydroxymethyl-5-methoxy-2,6-dimethyl-4,7-dioxoindole crotonate.

6. 1 - ethyl-3-hydroxymethyl-5-methoxy-2,6-dimethyl-4,7-dioxoindole phenylacetate.

7. 5 - chloro-1-ethyl-3-hydroxymethyl-2,6-dimethyl-4,7-dioxoindole acetate.

8. 1 - ethyl-3-hydroxymethyl-2-methyl-4,7-dioxoindole acetate.

References Cited by the Examiner

Cram et al.: Organic Chemistry, McGraw-Hill Book Co., Inc., New York, 1959, pages 75–77.

NICHOLAS S. RIZZO, *Primary Examiner.*